United States Patent
Fimoff et al.

(10) Patent No.: US 6,259,481 B1
(45) Date of Patent: Jul. 10, 2001

(54) FRAME TO FIELD CONVERTER

(75) Inventors: Mark Fimoff, Hoffman Estates; Wayne E. Bretl, Schaumburg, both of IL (US)

(73) Assignee: Zenith Electronics Corporation, Lincolnshire, IL (US)

(*) Notice: Subject to any disclaimer, the term of this patent is extended or adjusted under 35 U.S.C. 154(b) by 0 days.

(21) Appl. No.: 08/951,269

(22) Filed: Oct. 17, 1997

(51) Int. Cl.[7] .................................................. H04N 7/01
(52) U.S. Cl. ..................................... 348/456; 348/456
(58) Field of Search .................................. 348/447, 459, 348/458, 446, 607, 910, 441, 618, 445; H04N 7/01, 11/20

(56) References Cited

U.S. PATENT DOCUMENTS

| | | | | |
|---|---|---|---|---|
| 5,170,251 | * | 12/1992 | Levy | 348/458 |
| 5,231,490 | * | 7/1993 | Park | 348/445 |
| 5,754,247 | * | 5/1998 | Tauchi | 348/459 |
| 5,861,879 | * | 1/1999 | Shimizu et al. | 348/500 |
| 5,896,178 | * | 4/1999 | Inoue | 348/453 |

* cited by examiner

Primary Examiner—Michael Lee

(57) ABSTRACT

A frame to field converter includes a converter memory and an address generator. The address generator is arranged to repetitively generate a set of line selecting address sequences and to sequentially apply the addresses of successive ones of the line selecting address sequences to the converter memory. Each line selecting address sequence has a first portion of addresses and a second portion of addresses, and no address is repeated in the first portion of each line selecting address sequence. In response to these line selecting addresses, a first group of lines is written into the converter memory in frame order, and the first group of lines is subsequently read out of the converter memory in field order as a second group of lines is written into the converter memory in frame order.

37 Claims, 14 Drawing Sheets

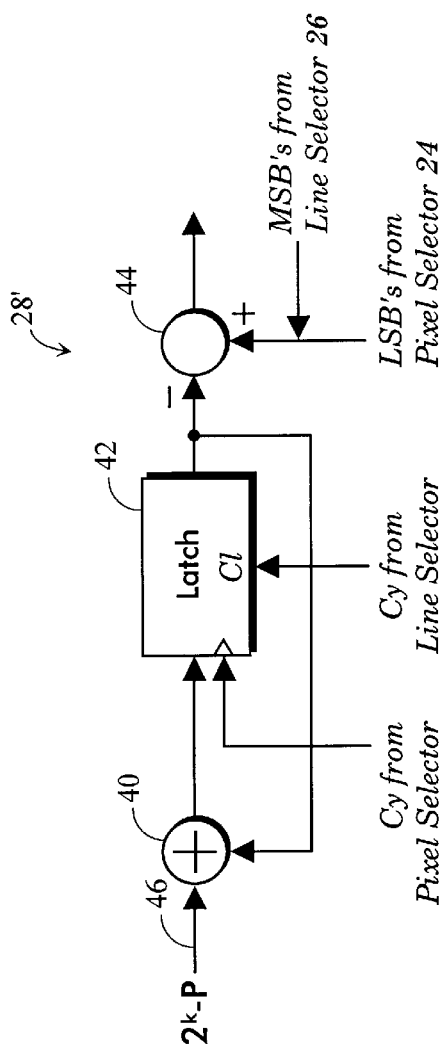

Fig. 6A

| Line Addr | Frame Ordered Input Seq 1 | Frame Ordered Input Seq 2 | Frame Ordered Input Seq 3 | Frame Ordered Input Seq 4 |
|---|---|---|---|---|
| 0 | B₀  A₁  G₁  J₁ | E₂  I₂  K₂  L₂ | F₃  I₃  K₃  L₃ | C₄  H₆ |
| 1 | D₀  B₁ | A₂  G₂  J₂ | E₃ | F₄ |
| 2 | F₀  C₁  H₁ | D₂ | B₃ | A₄  G₄  J₄ |
| 3 | H₀  D₁ | B₂ | A₃  G₃  J₃ | E₄  I₄  K₄  L₄ |
| 4 | J₀  E₁  I₁  K₁  L₁ | F₂ | C₃  H₃ | D₄ |
| 5 | L₀  F₁ | C₂  H₂ | D₃ | B₄ |
| Line addr seq | 0,1,2,3,4,5,0,2,4,0,4,4  Seq 1 | 1,3,5,2,0,4,1,5,0,1,0,0  Seq 2 | 3,2,4,5,1,0,3,4,1,3,1,1  Seq 3 | 2,5,0,4,3,1,2,0,3,2,3,3  Seq 4 |

| Frame Ordered Input Seq 5 | Frame Ordered Input Seq 6 | Frame Ordered Input Seq 7 |
|---|---|---|
| D₅ | B₆ | A₇  G₇  J₇ |
| C₅  H₅ | D₆ | B₇ |
| E₅  I₅  K₅  L₅ | F₆ | C₇  H₇ |
| F₅ | C₆  H₆ | D₇ |
| B₅ | A₆  G₆  J₆ | E₇  I₇  K₇  L₇ |
| A₅  G₅  J₅ | E₆  I₆  K₆  L₆ | F₇ |
| 5,4,1,0,2,3,5,1,2,5,2,2  Seq 5 | 4,0,3,1,5,2,4,3,5,4,5,5  Seq 6 | 0,1,2,3,4,5,0,2,4,0,4,4  Seq 7 |

| Line Address | 0 | 1 | 2 | 3 | 4 | 5 | 0 | 2 | 4 | 0 | 4 | 4 | 1 | 3 | 5 | 2 | 0 | 4 | 1 | 5 | 0 | 1 | 0 | 0 |
|---|---|---|---|---|---|---|---|---|---|---|---|---|---|---|---|---|---|---|---|---|---|---|---|---|
| Read (field order) | $B_0$ | $D_0$ | $F_0$ | $H_0$ | $J_0$ | $L_0$ | $A_1$ | $C_1$ | $E_1$ | $G_1$ | $I_1$ | $K_1$ | $B_1$ | $D_1$ | $F_1$ | $H_1$ | $J_1$ | $L_1$ | $A_2$ | $C_2$ | $E_2$ | $G_2$ | $I_2$ | $K_2$ |
| Write (frame order) | $A_1$ | $B_1$ | $C_1$ | $D_1$ | $E_1$ | $F_1$ | $G_1$ | $H_1$ | $I_1$ | $J_1$ | $K_1$ | $L_1$ | $A_2$ | $B_2$ | $C_2$ | $D_2$ | $E_2$ | $F_2$ | $G_2$ | $H_2$ | $I_2$ | $J_2$ | $K_2$ | $L_2$ |

| 3 | 2 | 4 | 5 | 1 | 0 | 3 | 4 | 1 | 3 | 1 | 1 | 2 | 5 | 0 | 4 | 3 | 1 | 2 | 0 | 3 | 2 | 3 | 3 |
|---|---|---|---|---|---|---|---|---|---|---|---|---|---|---|---|---|---|---|---|---|---|---|---|
| $B_2$ | $D_2$ | $F_2$ | $H_2$ | $J_2$ | $L_2$ | $A_3$ | $C_3$ | $E_3$ | $G_3$ | $I_3$ | $K_3$ | $B_3$ | $D_3$ | $F_3$ | $H_3$ | $J_3$ | $L_3$ | $A_4$ | $C_4$ | $E_4$ | $G_4$ | $I_4$ | $K_4$ |
| $A_3$ | $B_3$ | $C_3$ | $D_3$ | $E_3$ | $F_3$ | $G_3$ | $H_3$ | $I_3$ | $J_3$ | $K_3$ | $L_3$ | $A_4$ | $B_4$ | $C_4$ | $D_4$ | $E_4$ | $F_4$ | $G_4$ | $H_4$ | $I_4$ | $J_4$ | $K_4$ | $L_4$ |

| 5 | 4 | 1 | 0 | 2 | 3 | 5 | 1 | 2 | 5 | 2 | 2 | 4 | 0 | 3 | 1 | 5 | 2 | 4 | 3 | 5 | 4 | 5 | 5 |
|---|---|---|---|---|---|---|---|---|---|---|---|---|---|---|---|---|---|---|---|---|---|---|---|
| $B_4$ | $D_4$ | $F_4$ | $H_4$ | $J_4$ | $L_4$ | $A_5$ | $C_5$ | $E_5$ | $G_5$ | $I_5$ | $K_5$ | $B_5$ | $D_5$ | $F_5$ | $H_5$ | $J_5$ | $L_5$ | $A_6$ | $C_6$ | $E_6$ | $G_6$ | $I_6$ | $K_6$ |
| $A_5$ | $B_5$ | $C_5$ | $D_5$ | $E_5$ | $F_5$ | $G_5$ | $H_5$ | $I_5$ | $J_5$ | $K_5$ | $L_5$ | $A_6$ | $B_6$ | $C_6$ | $D_6$ | $E_6$ | $F_6$ | $G_6$ | $H_6$ | $I_6$ | $J_6$ | $K_6$ | $L_6$ |

| 0 | 1 | 2 | 3 | 4 | 5 | 0 | 2 | 4 | 0 | 4 | 4 |
|---|---|---|---|---|---|---|---|---|---|---|---|
| $B_6$ | $D_6$ | $F_6$ | $H_6$ | $J_6$ | $L_6$ | $A_7$ | $C_7$ | $E_7$ | $G_7$ | $I_7$ | $K_7$ |
| $A_7$ | $B_7$ | $C_7$ | $D_7$ | $E_7$ | $F_7$ | $G_7$ | $H_7$ | $I_7$ | $J_7$ | $K_7$ | $L_7$ |

*Fig. 6B*

| Line Addr | Frame Ordered Input | Frame Ordered Input | Frame Ordered Input |
|---|---|---|---|
| 0 | B₀ | A₁ G₁ J₁ | E₂ I₂ K₂ L₂ | K₃ L₃ |
| 1 | D₀ | B₁ | A₂ G₂ J₂ | I₃ J₃ |
| 2 | F₀ | C₁ H₁ | D₂ | C₃ D₃ |
| 3 | H₀ | D₁ | B₂ | A₃ B₃ |
| 4 | J₀ | E₁ I₁ K₁ L₁ | F₂ | E₃ F₃ |
| 5 | L₀ | F₁ | C₂ H₂ | G₃ H₃ |
| Line addr seq | | 0,1,2,3,4,5,0,2,4,0,4,4  Seq 1 | 1,3,5,2,0,4,1,5,0,1,0,0  Seq 2 | 3,2,4,5,1,0,3,2,4,5,1,0  Seq 3f |

| Frame Ordered Input | Frame Ordered Input | Frame Ordered Input |
|---|---|---|
| K₄ L₄ | F₅ L₅ | C₆ H₆ |
| I₄ J₄ | E₅ I₅ K₅ L₅ | F₆ |
| C₄ D₄ | B₅ | A₆ G₆ J₆ |
| A₄ B₄ | A₅ G₅ J₅ | E₆ I₆ K₆ L₆ |
| E₄ F₄ | C₅ H₅ | D₆ |
| G₄ H₄ | D₅ | B₆ |
| 3,2,4,5,1,0,3,2,4,5,1,0  Seq 3f | 3,2,4,5,1,0,3,4,1,3,1,1  Seq 3 | 2,5,0,4,3,1,2,0,3,2,3,3  Seq 4 |

*Fig. 7A*

| Line Address | Read (field order) | Write (frame order) |
|---|---|---|
| 0 | $B_0$ | $A_1$ |
| 1 | $D_0$ | $B_1$ |
| 2 | $F_0$ | $C_1$ |
| 3 | $H_0$ | $D_1$ |
| 4 | $J_0$ | $E_1$ |
| 5 | $L_0$ | $F_1$ |
| 0 | $A_1$ | $G_1$ |
| 2 | $C_1$ | $H_1$ |
| 4 | $E_1$ | $I_1$ |
| 0 | $G_1$ | $J_1$ |
| 4 | $I_1$ | $K_1$ |
| 4 | $K_1$ | $L_1$ |
| 1 | $B_1$ | $A_2$ |
| 3 | $D_1$ | $B_2$ |
| 5 | $F_1$ | $C_2$ |
| 2 | $H_1$ | $D_2$ |
| 0 | $J_1$ | $E_2$ |
| 4 | $L_1$ | $F_2$ |
| 1 | $A_2$ | $G_2$ |
| 5 | $C_2$ | $H_2$ |
| 0 | $E_2$ | $I_2$ |
| 1 | $G_2$ | $J_2$ |
| 0 | $I_2$ | $K_2$ |
| 0 | $K_2$ | $L_2$ |
| 3 | $B_2$ | $A_3$ |
| 2 | $D_2$ | $B_3$ |
| 4 | $F_2$ | $C_3$ |
| 5 | $H_2$ | $D_3$ |
| 1 | $J_2$ | $E_3$ |
| 0 | $L_2$ | $F_3$ |
| 3 | $A_3$ | $G_3$ |
| 2 | $C_3$ | $H_3$ |
| 4 | $E_3$ | $I_3$ |
| 5 | $G_3$ | $J_3$ |
| 1 | $I_3$ | $K_3$ |
| 0 | $K_3$ | $L_3$ |
| 3 | $B_3$ | $A_4$ |
| 2 | $D_3$ | $B_4$ |
| 4 | $F_3$ | $C_4$ |
| 5 | $H_3$ | $D_4$ |
| 1 | $J_3$ | $E_4$ |
| 0 | $L_3$ | $F_4$ |
| 3 | $A_4$ | $G_4$ |
| 2 | $C_4$ | $H_4$ |
| 4 | $E_4$ | $I_4$ |
| 5 | $G_4$ | $J_4$ |
| 1 | $I_4$ | $K_4$ |
| 0 | $K_4$ | $L_4$ |
| 3 | $B_4$ | $A_5$ |
| 2 | $D_4$ | $B_5$ |
| 4 | $F_4$ | $C_5$ |
| 5 | $H_4$ | $D_5$ |
| 1 | $J_4$ | $E_5$ |
| 0 | $L_4$ | $F_5$ |
| 3 | $A_5$ | $G_5$ |
| 4 | $C_5$ | $H_5$ |
| 1 | $E_5$ | $I_5$ |
| 3 | $G_5$ | $J_5$ |
| 1 | $I_5$ | $K_5$ |
| 1 | $K_5$ | $L_5$ |
| 2 | $B_5$ | $A_6$ |
| 5 | $D_5$ | $B_6$ |
| 0 | $F_5$ | $C_6$ |
| 4 | $H_5$ | $D_6$ |
| 3 | $J_5$ | $E_6$ |
| 1 | $L_5$ | $F_6$ |
| 2 | $A_6$ | $G_6$ |
| 0 | $C_6$ | $H_6$ |
| 3 | $E_6$ | $I_6$ |
| 2 | $G_6$ | $J_6$ |
| 3 | $I_6$ | $K_6$ |
| 3 | $K_6$ | $L_6$ |

*Fig. 7B*

FRAME TO FIELD CONVERTER

TECHNICAL FIELD OF THE INVENTION

The present invention relates to a frame to field converter and, more particularly, to a frame to field converter for use in connection with the decoding of compressed digital video data such as MPEG encoded video data.

BACKGROUND OF THE INVENTION

In many applications, an intelligence bearing signal is encoded, transmitted, and received in the form of plural blocks of data. Depending on the manner in which the blocks were generated, and depending upon their ultimate use, it is frequently necessary to transpose the blocks of data from the order in which they are received to a different order conforming with their intended use.

For example, in a television system which processes digital video pictures, each digital video picture is typically divided into a rectangular array having plural lines of video data, where each line of video data is comprised of a plurality of pixel values. The video data for what is known as an interlaced video sequence of pictures is characterized by a frame rate which is typically 30 Hz, and each frame is composed of two interlaced fields. The first field consists of the odd numbered lines of the frame (i.e., the lines numbered 1, 3, 5, . . . ), and the second field consists of the even numbered lines of the frame (i.e., the lines numbered 2, 4, 6, . . . ).

This interlaced video sequence may be encoded, typically by an MPEG-2 video encoder. The MPEG-2 video encoder may arbitrarily choose to encode the video data of a picture as either a frame or as separate fields. If the MPEG-2 video encoder chooses frame encoding, the video picture data is effectively encoded and transmitted in frame order (i.e., lines 1, 2, 3, 4, . . . are transmitted, in order, for that picture). If the MPEG-2 video encoder chooses field encoding, the video picture data is effectively encoded and transmitted in field order (i.e., lines 1, 3, 5, . . . followed by lines 2, 4, 6, . . . are transmitted, in order, for that picture). The MPEG-2 video encoder may change its encoding decision from picture to picture.

An MPEG-2 video decoder which receives this encoded video picture data must decode this interlaced video sequence and produce decoded pixel values in field order so that the pixel values can be displayed by a video display device which displays video data as interlaced fields. This decoding must be done whether the incoming encoded video picture data is in field order or frame order. Thus, when the incoming encoded video picture data is in frame order, the frame ordered decoded data must be converted to field order before it is sent to the interlaced display device. As discussed immediately below, the conversion of frame ordered video data to field ordered video data typically requires some amount of memory because lines of pixels must be output by a frame to field convertor in a different order than the order in which they were received and decoded.

That is, for the case of I and P type pictures, MPEG video decoding requires that these types of pictures be decoded and stored in memory so that the pixel data comprising these pictures may be used in the processing of other pictures. These I and P type pictures do not exit the decoder until they have been completely decoded and stored in memory. However, in the case of B type pictures, MPEG video decoding does not require storage because B type picture data is not used in the processing of other pictures. B type pictures can in principle be decoded and sent to the display device without storing them in memory.

When I and P type pictures are decoded in frame order and are stored in memory as required, they can easily be read out of memory in field order. No additional memory needs to be added to the system in order to achieve this conversion. B type pictures encoded in frame order, however, require some amount of memory to be added to the system so that they can be converted to field order.

A simple way of performing this conversion is to use two additional frame-size memories. As frame or field order data for picture n is stored in the first of these memories, the data for picture n−1 previously stored in the second of these memories is read out in field order. Then, when frame or field order data for picture n+1 is received, this data is stored in the second of these memories as the data for picture n previously stored in the first of these memories is read out in field order. This type of convertor requires a memory size of two frames, which adds to the expense of the converter.

The present invention is directed to a frame to field converter which employs a memory having a reduced size.

SUMMARY OF THE INVENTION

In accordance with one aspect of the present invention, a frame to field converter comprises a memory and an address generator. The frame to field converter converts input frames of video data to output fields of video data. The input frames include input lines of video data, and the output fields include output lines of video data. The memory is limited in size to substantially one field. The address generator is arranged to address the memory so that, as each output line of video data is written out of the memory, it is replaced by an input line of video data.

In accordance with another aspect of the present invention, a frame to field converter comprises a converter memory and an address generator. The address generator is arranged to repetitively generate a set of different address sequences and to sequentially apply the addresses of successive ones of the generated address sequences to the converter memory so that a first group of lines is written into the converter memory in frame order, so that the first group of lines is read out of the converter memory in field order and a second group of lines is written into the converter memory in frame order, and so that as each line of the first group of lines is read out of the converter memory, it is replaced by a line of the second group of lines before a next line of the first group of lines is read out of the converter memory.

In accordance with yet another aspect of the present invention, a frame to field converter comprises a converter memory and an address generator. The address generator is arranged to repetitively generate a set of address sequences and to sequentially apply the addresses of successive ones of the generated address sequences to the converter memory. A first sequence of addresses has a first portion of addresses and a second portion of addresses. No address is repeated in the first portion of addresses. The addresses of the second portion of addresses and the addresses of the other address sequences in the set of address sequences are determined from the first portion of addresses based upon the following delay pattern: L/2, L−1, (L/2)−1, L−2, (L/2)−2, L−3, (L/2)−3, . . . , 1, L/2, where L is the number of lines in a frame and is constrained to be even.

BRIEF DESCRIPTION OF THE DRAWINGS

These and other features and advantages of the present invention will become more apparent from a detailed consideration of the invention when taken in conjunction with the drawings in which:

FIG. 4 illustrates an alternative mapper for the mapper which is illustrated in FIG. 3;

FIGS. 5A and 5B are charts representing an example of line select addresses generated by the line selector of FIG. 3 for the conversion of a hypothetical twelve line frame from frame order to field order;

FIGS. 6A and 6B are charts representing a more detailed example of line select addresses generated by the line selector of FIG. 3 for the conversion of a series of hypothetical twelve line frames from frame order to corresponding field order;

FIGS. 7A and 7B are charts representing an example of line select addresses generated by the line selector of FIG. 3 for the conversion of video data having an mix of frame order and field order from frame or field order to field order;

DETAILED DESCRIPTION

Figure 1:
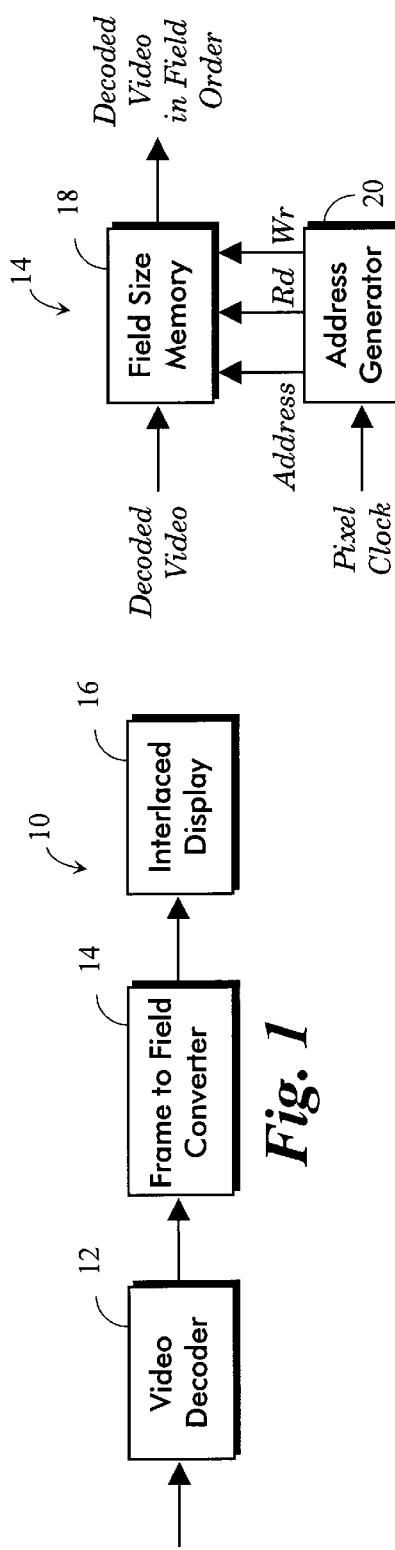
FIG. 1 illustrates a television system employing a frame to field converter according to the present invention.

As shown in FIG. 1, a television system 10 includes a video decoder 12, which may be a conventional MPEG video decoder that decompresses and decodes an input video data signal. The output video data from the video decoder 12 may be either in frame order or field order. This output video data is supplied to a frame to field converter 14. If the output video data from the video decoder 12 is in frame order, the frame to field converter 14 converts the frame ordered video data to field ordered video data. If the output video data provided by the video decoder 12 is in field order, the frame to field converter 14 essentially passes the field ordered video data to an interlaced display 16. Accordingly, all of the video data supplied to the interlaced display 16 is in field order.

Figure 2:
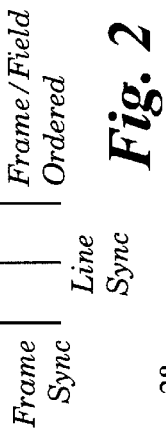
FIG. 2 illustrates, in additional detail, that the frame to field converter of FIG. 1 includes a field-size memory and an address generator.

The frame to field converter 14 in accordance with the present invention is illustrated in FIG. 2 and includes a field-size memory 18. The field-size memory 18 stores video data from the video decoder 12 and provides the stored video data in field order to the interlaced display 16 under control of address, read, and write inputs from an address generator 20. The address generator 20 responds to a pixel clock, a frame sync, and a line sync for generating sequences of addresses so that, as a first line of video data from the video decoder 12 is stored in the field-size memory 18, a second line of video data previously stored in the field-size memory 18 is read out and is replaced by the first line currently being stored in the field-size memory 18.

The address generator 20 also responds to a frame/field order output of the video decoder 12 in order to produce the correct address sequences for the field-size memory 18, depending upon whether the video data provided by the video decoder 12 to the field-size memory 18 is in frame order or field order.

Accordingly, the address generator 20 generates a set of address sequences which are applied to the field-size memory 18, where each address sequence is different from the previous address sequence. After the last address sequence in the set is applied to the field-size memory 18, the first address sequence of the set is re-applied to the field-size memory 18. This addressing process continues as long as the video decoder 12 supplies video data to the frame to field converter 14.

As each address is applied to the field-size memory 18, the pixel data present at that location is read out and sent to the interlaced display 16. New pixel data from the video decoder 12 is written into the same memory location. By properly choosing the set of address sequences, frame ordered data input to the field-size memory 18 is correctly read out in field order at the pixel rate in a continuous manner using only a half frame size memory.

Figure 3:
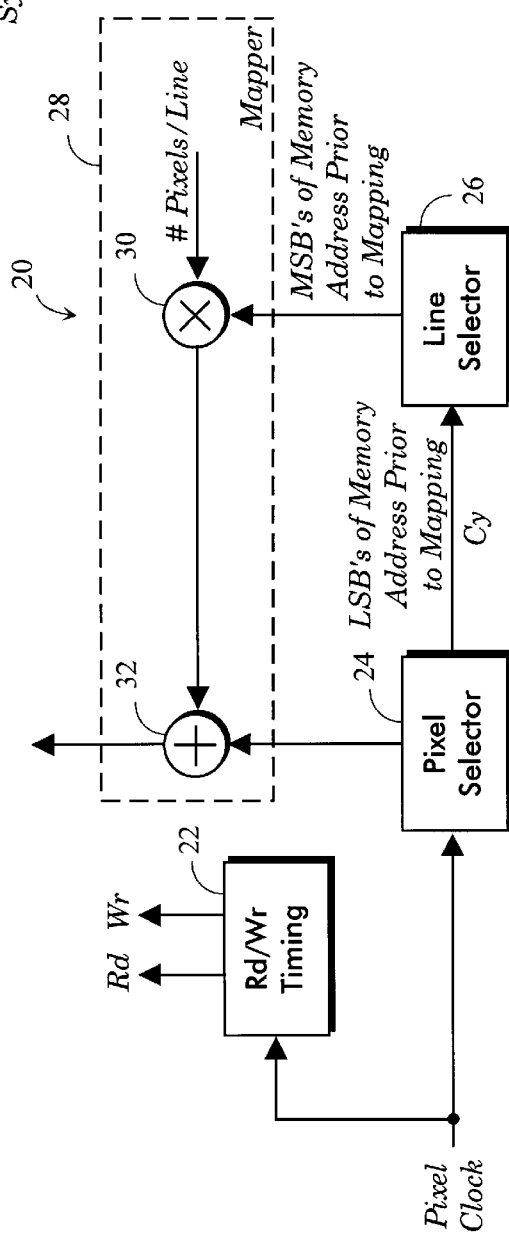
FIG. 3 illustrates, in additional detail, that the address generator of the frame to field converter of FIG. 2 includes a pixel selector, a line selector, and a mapper.

As shown in FIG. 3, the address generator 20 of FIG. 2 includes a read/write timing signal generator 22, a pixel selector 24, a line selector 26, and a mapper 28. The pixel selector 24, for example, may be implemented as a counter. The line selector 26 will be described below in detail, but is assumed for purposes of the present discussion to be also a simple counter. The pixel selector 24 responds to the pixel clock, which operates at pixel rate, in order to generate the least significant bits of an address location of the field-size memory 18. The line selector 26 responds to the carryover output of the pixel selector 24 for generating the most significant bits of an address location of the field-size memory 18. The counters of the pixel selector 24 and the line selector 26 increment in normal fashion.

As these counters of the pixel selector 24 and the line selector 26 increment, the line selector output of the line selector 26 selects a line of video data stored in the field-size memory 18, and the pixel selecting output of the pixel selector 24 sequentially selects the pixels within the selected line by incrementing in normal order from 0 to P–1, where P is the number of pixels in a line of video data. The read/write timing signal generator 22 responds to the pixel clock in order to supply both a read pulse and a write pulse to the field-size memory 18 for each pixel clock. During the read pulse, a pixel is read out of the addressed storage location of the field-size memory 18, and during the subsequent write pulse, an incoming pixel is written into that same addressed storage location.

The generation of separate pixel and line output counts for address locations (corresponding to a display raster grid) and combining them to form a single memory address, with the output of the line selector 26 forming the most significant bits of the memory address and the output of the pixel selector 24 forming the least significant bits of the memory address, can create a problem. This problem may be seen from the very simple hypothetical frame having six lines and five pixels per line (such that P is 5), where a three bit counter is used for the pixel selector 24. This three bit counter would normally generate eight different counts from 000 to 111. However, this counter is configured to reset, and to produce a carryover output, on the fifth count so that the output of this counter repeatedly cycles through counts 000 to 100.

These output counts from the pixel selector 24 are appended to the output counts from the line selector 26 so that, if the counter of the line selector 26 is also a three bit counter, the address generated by the address generator 20 looks like XXX XXX. Therefore, the first seven addresses generated by the address generator 20 are, in sequence, 000 000, 000 001, 000 010, 000 011, 000 100, 001 000, and 001 001. As can be seen, three pixel address locations of the memory (i.e., 000 101, 000 110, and 000 111) are not used and are, therefore, wasted. That is, the memory must be 8×6 in order to accommodate the addressing scheme described above, even though only 5×6 of the memory is used.

This waste of memory space can be prevented by the mapper 28 so that no address locations are skipped. The mapper 28 functions by adding the bits from the line selector 26 to the bits from the pixel selector 24 in such a way that each pixel memory location of the memory is accessed.

The mapper 28 includes a multiplier 30 which multiplies the bits from the line selector 26 by a quantity P. The quantity P equals the number of pixels per line of the video data supplied by the video decoder 12. In the case of the hypothetical frame discussed above where there are five pixels per line, the multiplier 30 multiplies the bits from the line selector 26 by five. The output from the multiplier 30 is then added by an adder 32 to the bits provided by the pixel selector 24.

Accordingly, when the first line of the field-size memory 18 is accessed, the multiplier 30 multiplies the output of the line selector 26 (i.e., 0) by five to produce an input of 0 to the adder 32. The adder 32 adds this 0 to the first five outputs (i.e., 0, 1, 2, 3, and 4) from the pixel selector 24 to produce the first five addresses (i.e., 0, 1, 2, 3, and 4) for the field-size memory 18.

When the second line of the field-size memory 18 is accessed, the multiplier 30 multiplies the output of the line selector 26 (i.e., 1) by five to produce an input of 5 to the adder 32. The adder 32 adds this 5 to the first five outputs (i.e., 0, 1, 2, 3, and 4) from the pixel selector 24 to produce the next five addresses (i.e., 5, 6, 7, 8, and 9) for the field-size memory 18.

When the third line of the field-size memory 18 is accessed, the multiplier 30 multiplies the output of the line selector 26 (i.e., 2) by five to produce an input of 10 to the adder 32. The adder 32 adds this 10 to the first five outputs (i.e., 0, 1, 2, 3, and 4) from the pixel selector 24 to produce the next five addresses (i.e., 10, 11, 12, 13, and 14) for the field-size memory 18, and so on.

FIG. 4 shows a mapper 28' which may alternatively be used for the mapper 28' shown in FIG. 3. The mapper 28' includes an adder 40, a latch 42, and a subtractor 44. The adder 40 receives a constant equal to $2^k - P$ at its input 46, where k is the number of bit positions in the counter of the pixel selector 24, and where P is the number of pixels per line. In the above case of the hypothetical frame having six lines and five pixels per line, the latch 42 may be a 4 bit latch, k is 3 for the 3 bit counter of the pixel selector 24, and P is 5 for the 5 pixels in a line. The second input of the adder 40 is from the output of the latch 42.

The latch 42 is enabled by the carryover output from the pixel selector 24, and is cleared by the carryover output from the line selector 26. Thus, at the end of each line, the carryover output from the pixel selector 24 causes the latch 42 to latch its input (the output from the adder 40) to its output.

When the latch 42 is initially cleared at the end of one of the hypothetical frames, its output is 0. The adder 40 adds this 0 to the constant 3 (where k is 3 and P is 5) on its input 46 and provides the result (i.e., 3) to the input of the latch 42 so that, at the end of the first line of the next hypothetical frame, the carryover output from the pixel selector 24 causes the value 3 at the input of the latch 42 to be latched to its output. The value 3 now at the output of the latch 42 is added to the constant 3 on the input 46 to produce an output of 6 from the adder 40 which is not latched to the output of the latch 42 until the next carryover output from the pixel selector 24. In this way, the output of the latch 42 is 0, 3, 6, 9, 12, 15, 0, 3, . . . .

The bits from the line selector 26 are appended to the bits from the pixel selector 24 as illustrated in FIG. 4, and the resulting bit combination is presented to one input of the subtractor 44. The subtractor 44 subtracts the output of the latch 42 from the combination of the bits from the line selector 26 and the bits from the pixel selector 24, with the bits from the line selector 26 forming the most significant bits and the bits from the pixel selector 24 forming the least significant bits. Accordingly, when the addresses 0, 1, 2, 3, and 4 from the pixel selector 24 and the line selector 26 corresponding to a first line of a frame are presented to the subtractor 44, the output of the latch 42 is 0, and the subtractor 44 subtracts the latch output value of 0 from these addresses to produce the addresses 0, 1, 2, 3, and 4. However, when the addresses 8, 9, 10, 11, and 12 from the pixel selector 24 and the line selector 26 corresponding to a second line of the frame are presented to the subtractor 44, the output of the latch 42 is now 3, and the subtractor 44 subtracts the latch output value of 3 from these addresses to produce the addresses 5, 6, 7, 8, and 9. Accordingly, the mapper 28' achieves the same result as the mapper 28.

In order to provide the proper frame to field conversion, the line selector 26 must generate line select addresses in the correct sequence. The pixel selector 24 generates its pixel addresses in order from 0 to P−1, where P is the number of pixels per line. However, the line selector 26 cannot generate its output in sequence if it is to properly convert frame order to field order. The operation of the line selector 26 may be explained with reference to a hypothetical frame consisting of twelve lines (the number of pixels per line is inconsequential to the operation of the line selector 26). In order to convert this hypothetical frame from frame order to field order, the field-size memory 18 must be large enough to hold six lines, which is the size of one field of this hypothetical frame.

The line select addresses for this six line memory are 0, 1, 2, 3, 4, and 5 as shown in FIG. 5A. Also, the lines of this twelve line hypothetical frame are designated, in frame order, as A, B, C, D, E, F, G, H, I, J, K, and L. Accordingly, these lines exit the video decoder 12 and enter the field-size memory 18 in this frame order. However, it is desired to read these lines of pixels out of the field-size memory 18 in field order A, C, E, G, I, K, B, D, F, H, J, L. Thus, the locations within the field-sized memory 18 at which these lines are stored vary, as discussed below.

Since frame after frame of data enters the field-size memory 18 in a continuous manner at a fixed rate, this data must be continuously read out in field order at the same rate. At a given point in time, it may be assumed that the field-size memory 18 holds the lines $B_0$, $D_0$, $F_0$, $H_0$, $J_0$, $L_0$. of the second field in a frame in line memory locations 0, 1, 2, 3, 4, and 5, respectively, as shown in FIGS. 5A and 5B. The first six lines of the next frame enter the field-size memory 18 from the video decoder 12 in the frame order $A_1$, $B_1$, $C_1$, $D_1$, $E_1$, $F_1$. As each line enters the field-size memory 18, a line already stored in the field-size memory 18 is read out. As a line already stored in the field-size memory 18 is read out, a corresponding entering line is written to the same line location in the field-size memory 18 so that the entering line replaces the line read out.

Since lines $B_0$, $D_0$, $F_0$, $H_0$, $J_0$, $L_0$ must be read out in field order, the addressing sequence from the line selector 26 must be 0, 1, 2, 4, 5. At the same time, lines $A_1$, $B_1$, $C_1$, $D_1$, $E_1$, $F_1$, must be written into the field-size memory 18 in frame order at the locations addressed by the addresses 0, 1, 2, 3, 4, and 5. Accordingly, line $B_0$ is read out of location 0, and line $A_1$, is written into location 0; line $D_0$. is read out of location 1, and line $B_1$ is written into location 1; line $F_0$. is read out of location 2, and line $C_1$ is written into location 2; line $H_0$ is read out of location 3, and line $D_1$ is written into location 3; line $J_0$ is read out of location 4, and line $E_1$ is written into location 4; and, line $L_0$ is read out of location 5, and line $F_1$ is written into location 5. This operation is shown in step 2 of FIG. 5A.

As the next lines $G_1$, $H_1$, $I_1$, $J_1$, $K_1$, $L_1$ of the frame exit the video decoder 12 and enter the field-size memory 18, the lines previously stored in the field-size memory 18 (i.e., $A_1$, $B_1$, $C_1$, $D_1$, $E_1$, $F_1$) must be read out in field order. Accordingly, line $A_1$ is read out of location 0, and line $G_1$ is written into location 0; line $C_1$ is read out of location 2, and line $H_1$ is written into location 2; line $E_1$ is read out of location 4, and line $I_1$, is written into location 4; line $G_1$ is read out of location 0, and line $J_1$ is written into location 0; line $I_1$, is read out of location 4, and line $K_1$ is written into location 4; and, line $K_1$ is read out of location 4, and line $L_1$ is written into location 4. These operations are shown in steps 3, 4, and 5 of FIG. 5A.

Thus, in order for the above described operation to occur in connection with the hypothetical twelve line frame, the line selector 26 must generate the following address sequence; 0, 1, 2, 3, 4, 5, 0, 2, 4, 0, 4, 4. This addressing scheme is shown in both FIGS. 5A and 5B.

FIGS. 6A and 6B shows the above process continued over a number of hypothetical twelve line input frames, with the line selector 26 supplying a set of six different address sequences so that the lines stored in the field-size memory 18 are read out in field order and so that they are replaced by lines of input frames arriving in frame order. It should be noted that, after six address sequences from the line selector 26, the first address sequence is repeated. Therefore, this set of these six address sequences (Seq1, Seq2, Seq3, Seq4, Seq5, and Seq6) must be generated repeatedly by the line selector 26 in order to continuously perform the required frame to field reordering.

As discussed above, the output frames from the video decoder 12 may be in frame or field order, and the order can change from one frame to the next. The address sequences described above in connection with FIGS. 6A and 6B perform well in connection with the hypothetical twelve line frames if the output of the video decoder 12 is always frame ordered. However, the line selector 26 must be configured so that it operates differently if the output of the video decoder 12 is field ordered.

FIGS. 7A and 7B show the address sequences which must occur in the example of the hypothetical twelve line frames when the video decoder 12 provides two successive frames in frame order, followed by two successive frames in field order, followed by two successive frames in frame order. The example of FIGS. 7A and 7B assumes the same initial conditions as were assumed in connection with the example of FIGS. 5A, 5B, 6A, and 6B. The charts of FIGS. 7A and 7B show the address sequences which must be generated by the line selector 26 in order to reorder the line data that exits the video decoder 12. Again, since frame after frame of line data enters the field-size memory 18 in a continuous manner at a fixed rate (in either frame or field order), this line data must be continuously read out of the field-size memory 18 in field order at the same rate.

It is noted with respect to FIGS. 7A and 7B that the line selector 26 must generate the same address sequences (Seq1 and Seq2) with respect to the first two frames as were generated with respect to the first two frames of FIGS. 6A and 6B. However, the line selector 26 must generate a modified address sequence Seq3 (designated as seq3f in FIG. 7A) with respect to the next two frames from the video decoder 12 because the next two frames are in field order. As shown in FIGS. 7A and 7B, the first six line select addresses of Seq3f are repeated in the same order for the first of a series of field order frames exiting the video decoder 12, so that this address sequence is 3, 2, 4, 5, 1, 0, 3, 2, 4, 5, 1, 0. This same sequence is repeated for all subsequent consecutive field order frames. As soon as a frame order frame exits the video decoder 12, then the full sequence Seq3 (i.e., 3, 2, 4, 5, 1, 0, 3, 4, 1, 3, 1, 1) must be generated. The next frame from the video decoder 12 is frame ordered so Seq4 must be generated by the line selector 26.

In summary, it can be seen that, for frame ordered video data arranged in the hypothetical twelve line frames, the line selector 26 generates Seq1, Seq2, . . . , Seq6 repeatedly; however, whenever the video data is field ordered, SeqNf is generated, where N is the number of the next address sequence number following the last frame ordered video data. SeqNf is a modified version of this next expected sequence in which the first six addresses are repeated as shown in FIGS. 7A and 7B. The line selector 26 continues to generate the address sequence SeqNf until frame ordered video data is received from the video decoder 12. Then SeqN is generated in full. If the next video from the video decoder 12 is also frame ordered, then address sequence Seq(N+1) is generated.

In order to understand the discussion below, the address sequences shown in FIGS. 6A and 6B (i.e., Seq1, Seq2, Seq3, Seq4, Seq5, Seq6, and Seq1) are replicated in Table 1 below.

TABLE 1

| Row# | Col.# | 1 | 2 | 3 | 4 | 5 | 6 | 7 | 8 | 9 | 10 | 11 | 12 |
|---|---|---|---|---|---|---|---|---|---|---|---|---|---|
| 1 | Seq1: | 0 | 1 | 2 | 3 | 4 | 5 | 0 | 2 | 4 | 0 | 4 | 4 |
| 2 | Seq2: | 1 | 3 | 5 | 2 | 0 | 4 | 1 | 5 | 0 | 1 | 0 | 0 |
| 3 | Seq3: | 3 | 2 | 4 | 5 | 1 | 0 | 3 | 4 | 1 | 3 | 1 | 1 |
| 4 | Seq4: | 2 | 5 | 0 | 4 | 3 | 1 | 2 | 0 | 3 | 2 | 3 | 3 |
| 5 | Seq5: | 5 | 4 | 1 | 0 | 2 | 3 | 5 | 1 | 2 | 5 | 2 | 2 |
| 6 | Seq6: | 4 | 0 | 3 | 1 | 5 | 2 | 4 | 3 | 5 | 4 | 5 | 5 |
| 7 | Seq1: | 0 | 1 | 2 | 3 | 4 | 5 | 0 | 2 | 4 | 0 | 4 | 4 |

Each entry in Table 1 represents an address provided by the line selector 26 and can be denoted by its row and column position in Table 1 as (r,c). As the line selector 26 provides the series of line select addresses, it effectively traverses Table 1 repeatedly in a row by row manner (row 1, row 2, . . . , row 6, row 1, . . . ). Thus, the table entry at (1,12) is followed by the table entry (2,1), the table entry at (2,12) is followed by the table entry (3,1), the table entry at (3,12) is followed by the table entry (4,1), the table entry at (4,12) is followed by the table entry (5,1), the table entry at (5,12) is followed by the table entry (6,1), the table entry at (6,12) is followed by the table entry (1,1), and so on.

It is noted with respect to Table 1 that, for any given row r, the line select address in column 1, denoted as position (r,1), repeats six positions later at position (r,7) in Table 1. Thus, for example, line select address 0 at position (1,1) repeats six positions later at position (1,7); line select address 1 at position (2,1) repeats six positions later at position (2,7); and so on. It is similarly noted that all line select addresses in the second column, (r,2), repeat eleven positions later at (r+1,1) in Table 1. Thus, for example, line select address 1 at position (1,2) repeats eleven positions later at position (2,1); line select address 3 at position (2,2) repeats eleven positions later at position (3,1); and so on. It is further noted that all line select addresses in the third column, (r,3), repeat five positions later at (r,8) in Table 1. Thus, for example, line select address 2 at position (1,3) repeats five positions later at position (1,8); line select address 5 at position.(2,3) repeats five positions later at position (2,8); and so on. In fact, all addresses in a given column have the same amount of delay before they repeat.

For the hypothetical twelve line frame, this pattern of delays is as follows: for column 1, the delay is six; for column 2, the delay is eleven; for column 3, the delay is five; for column 4, the delay is ten; for column 5, the delay is four; for column 6, the delay is nine; for column 7, the delay is three; for column 8, the delay is eight; for column 9, the delay is two; for column 10, the delay is seven; for column 11, the delay is one; and, for column 12, the delay is six. If L represents the number of lines in a frame, then the delays for the hypothetical twelve line frame can be expressed as follows: for column 1, the delay is L/2; for column 2, the delay is L−1; for column 3, the delay is (L/2)−1; for column 4, the delay is L−2; for column 5, the delay is (L/2)−2; for column 6, the delay is L−3; for column 7, the delay is (L/2)−3; for column 8, the delay is L−4; for column 9, the delay is (L/2)−4; for column 10, the delay is L−5; for column 11, the delay is (L/2−5)=1; and, for column 12, the delay is L−6=L/2. In general, for any frame having L lines, where L is an even number, it can be shown that the delay pattern may be expressed as follows: L/2, L−1, (L/2)−1, L−2, (L/2)−2, L−3, (L/2)−3, . . . , (L/2)−[(L−2)−1]=1, and L−(L/2)=L/2.

Figure 8:
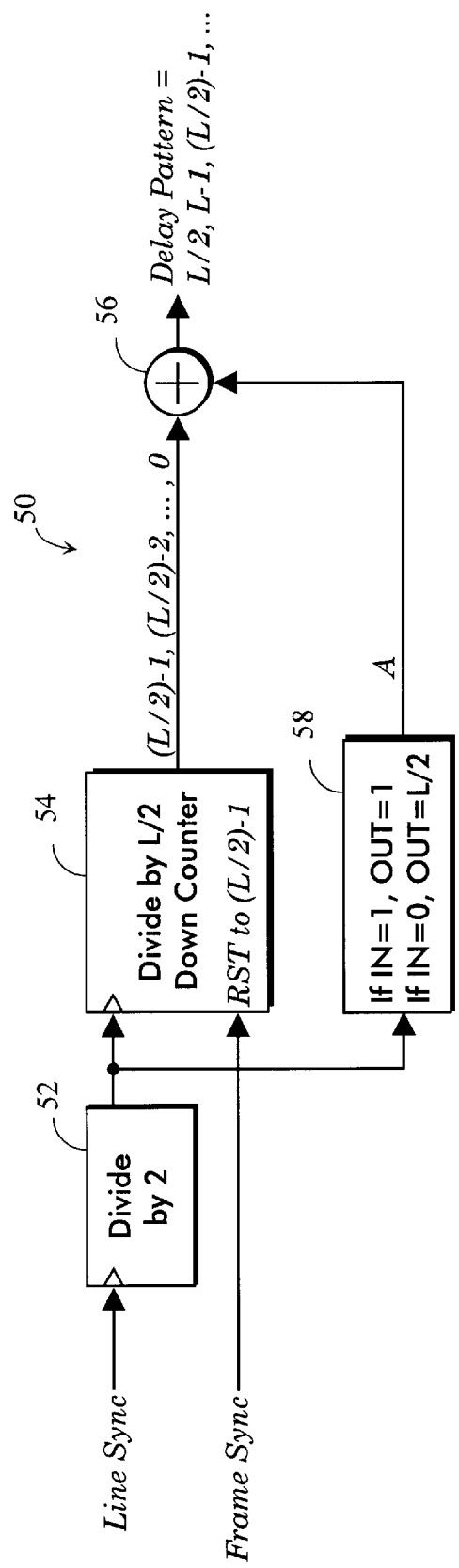
FIG. 8 illustrates a first embodiment of a delay pattern generator useful in practicing the present invention.

This delay pattern may be generated by a delay pattern generator 50 shown in FIG. 8. The delay pattern generator 50 includes a divide-by-two counter 52, a divide-by-L/2 down counter 54, an adder 56, and an output selector 58. The divide-by-two counter 52 divides the line sync rate in half. The divide-by-L/2 down counter 54 counts down from a count of (L/2)−1 to 0. These counts are added by the adder 56 to the output of the output selector 58 which is controlled by the output of the divide-by-two counter 52. The output selector 58 provides an output of 1 if its input is high, and an output of L/2 if its input is low.

Figure 9:
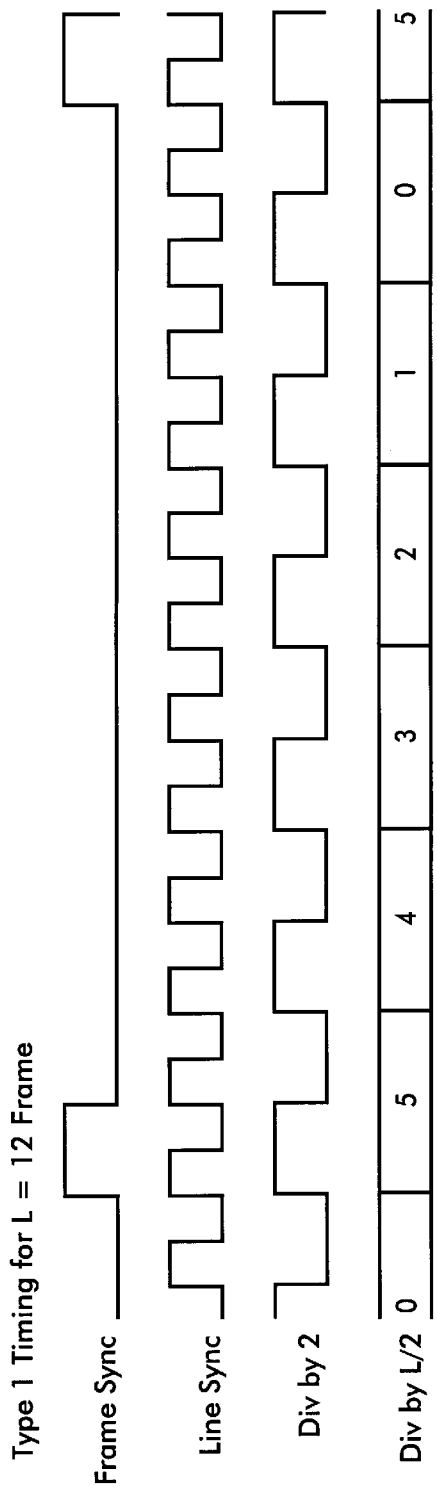
FIG. 9 illustrates a timing chart for the delay pattern generator of FIG. 8.

FIG. 9 is a timing diagram for the delay pattern generator 50, assuming the hypothetical twelve line frame discussed above. However, it should be noted that the delay pattern generator 50 at FIG. 8 is a generalized generator which may be used for a frame having any even number of lines.

Figure 10:
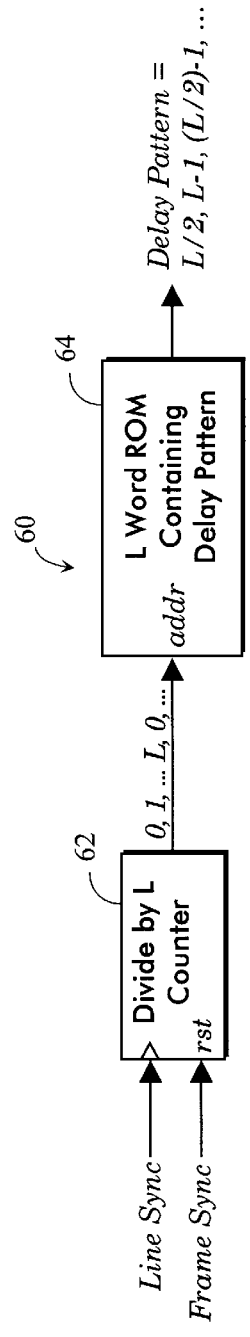
FIG. 10 illustrates a second embodiment of a delay pattern generator useful in practicing the present invention.

Alternatively, a delay pattern generator 60 as shown in FIG. 10 may be implemented. The delay pattern generator 60 has a divide-by-L counter 62 and a RAM 64. The divide-by-L counter 62 is clocked by the line sync and is reset by a frame sync at the beginning of each frame. The RAM 64 is addressed by the output of the divide-by-L counter 62 in order to read out the delay pattern described above.

Either of the delay pattern generators 50 or 60 may be used as a delay pattern generator 70 in the line selector 26.

Figure 11:
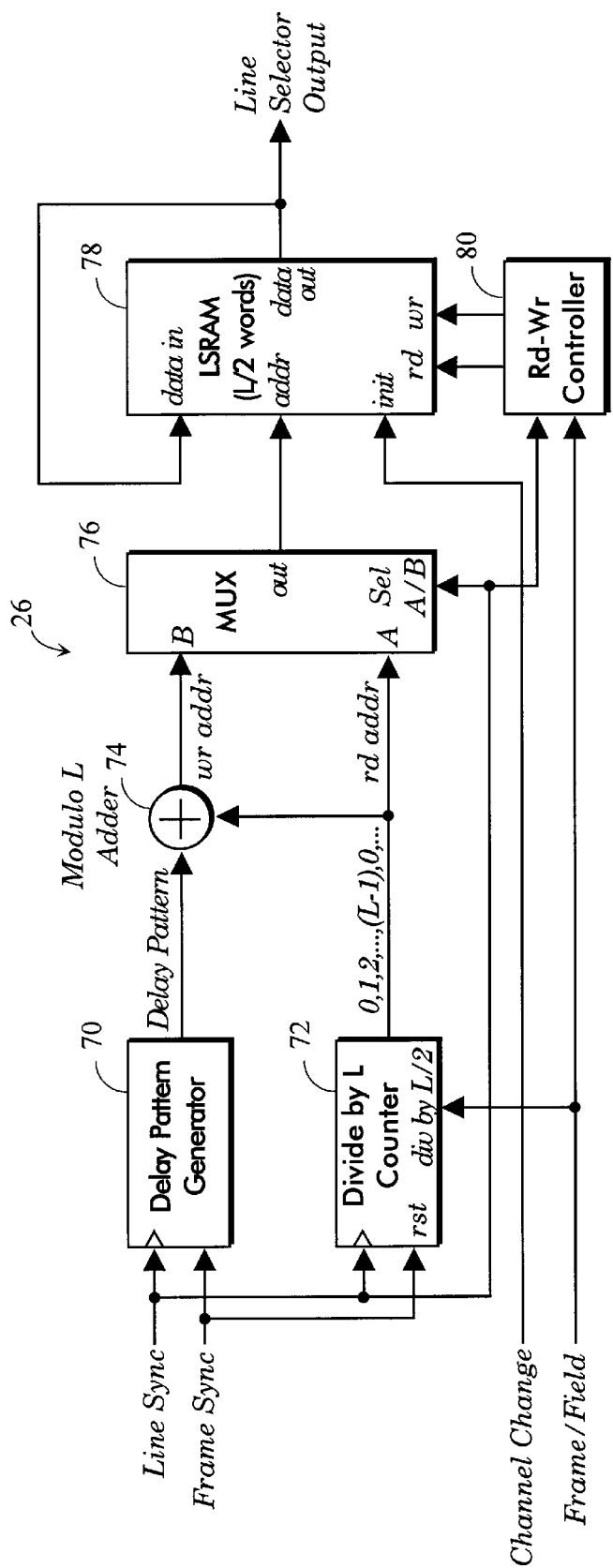
FIG. 11 illustrates the line selector of FIG. 3 in additional detail.

The line selector 26 is shown in more detail in FIG. 11 and includes, in addition to the delay pattern generator 70, a divide-by-L.counter 72, a modulo L adder 74, a multiplexer 76, a RAM 78, and a read/write controller 80. A frame/field output from the video decoder 12, which indicates whether the output of the video decoder 12 is frame ordered or field ordered, is provided to both the divide-by-L counter 72 and the read/write controller 80. When the frame/field input to the divide-by-L counter 72 indicates that the output from the video decoder 12 is field ordered, the divide-by-L counter 72 is converted to a divide-by-L/2 counter, and the read/write controller 80 is inhibited from producing a write signal.

The delay pattern generator 70 is clocked by the line sync and reset by the frame sync. Similarly, the divide-by-L counter 72 is also clocked by the line sync and reset by the frame sync. The divide-by-L counter 72 counts up from 0 to L−1 for each frame. The outputs from the delay pattern generator 70 and from the divide-by-L counter 72 are added modulo L by the modulo L adder 74 to form a write address for the RAM 78. The output from the divide-by-L counter 72 forms a read address for the RAM 78. The multi-plexer 76 and the read/write controller 80 are toggled by the line sync to alternately apply to the RAM 78 both a combination of a write address from the multiplexer 76 and a write signal from the read/write controller 80 and a combination of a read address from the multiplexer 76 and a read signal from the read/write controller 80 during one line sync cycle. Thus, during one line sync cycle, a line select address is read out of one storage location of the RAM 78 as determined by the address from the divide-by-L counter 72, and that line select address is written back into another storage location of the RAM 78 as determined by the address from the modulo L adder 74.

Figure 12A:
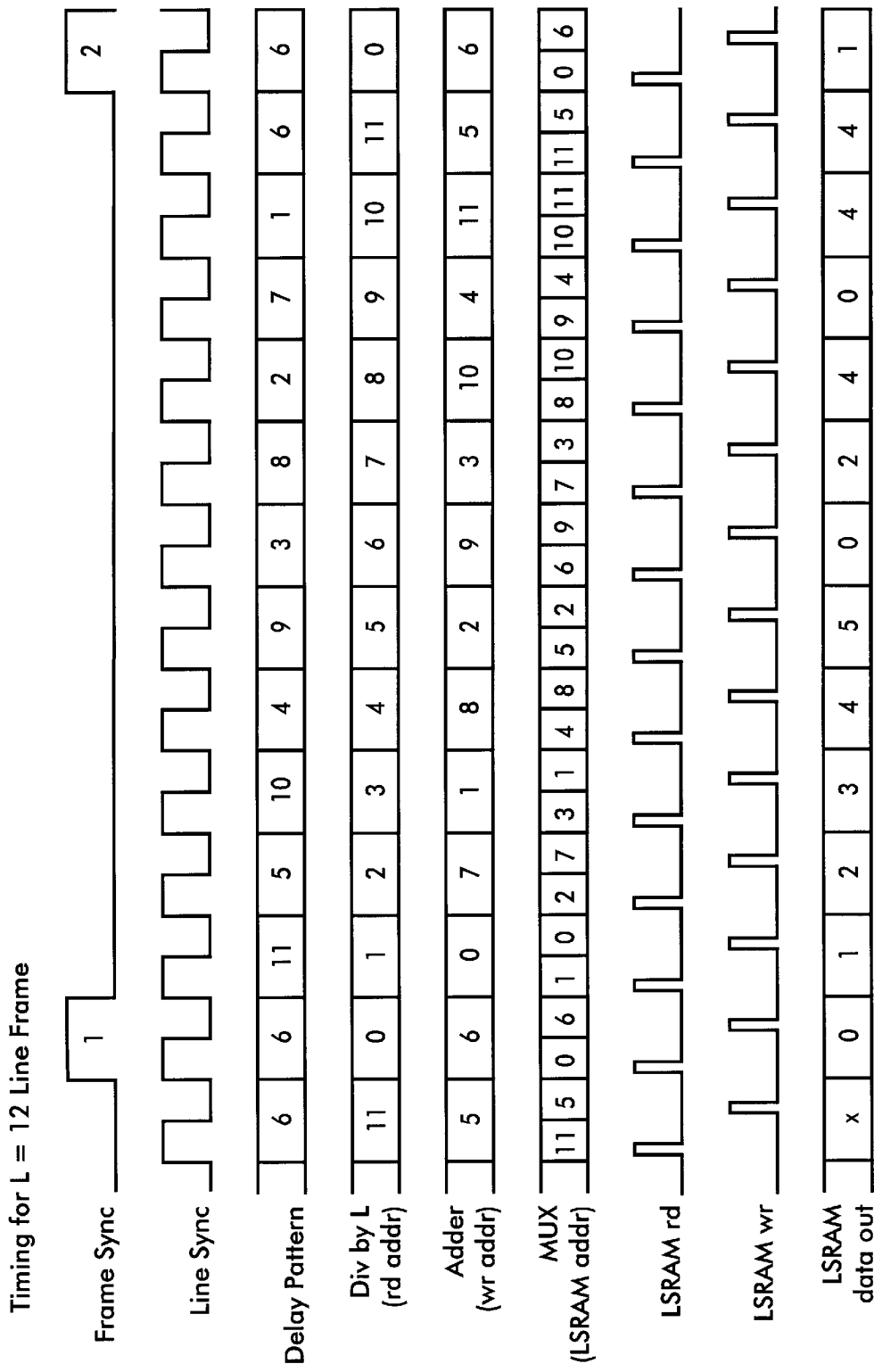
FIGS. 12A–12C, taken together, illustrate a frame order to field order conversion timing chart for the line selector of FIG. 11.
Figure 12B:
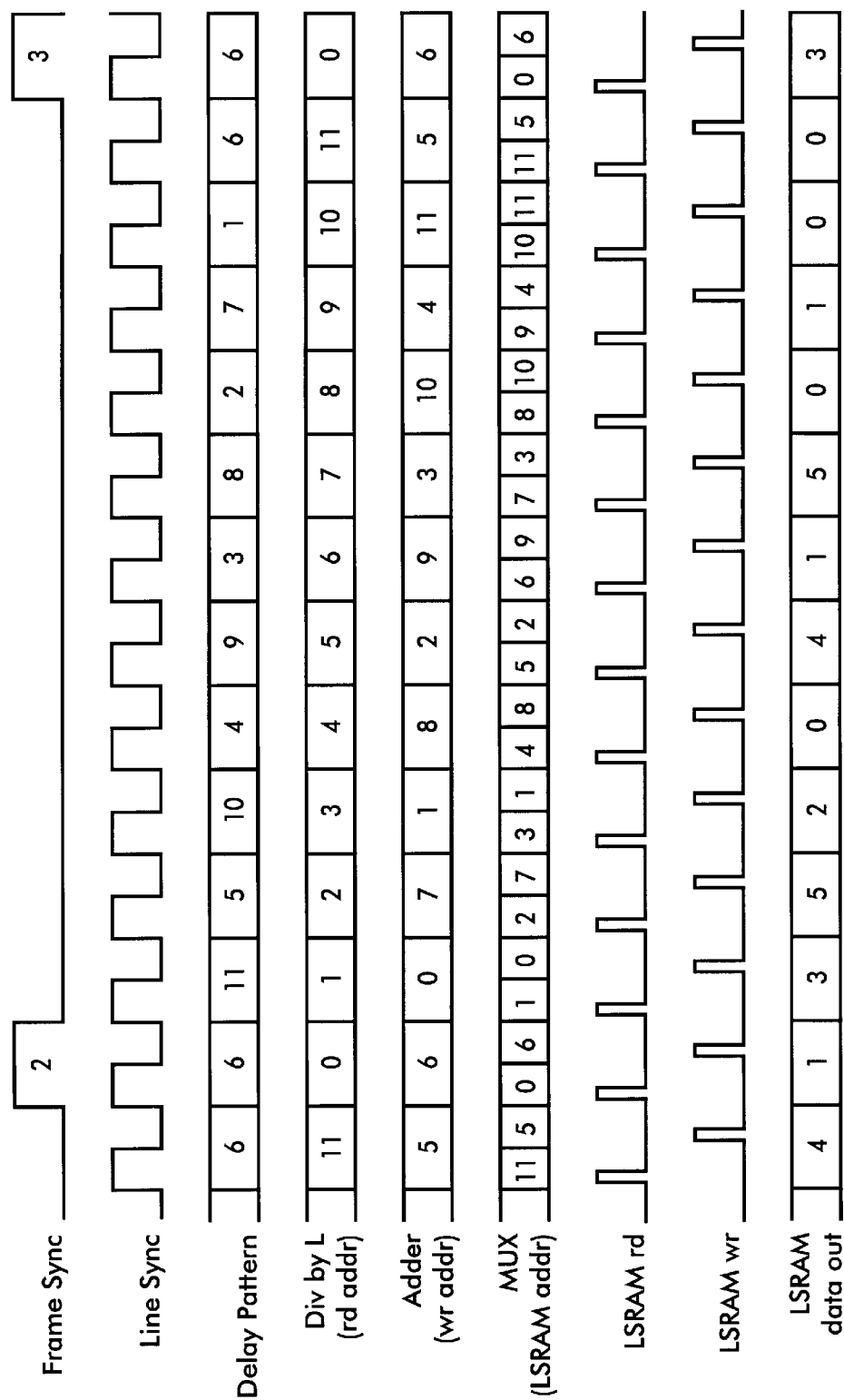
Figure 12C:
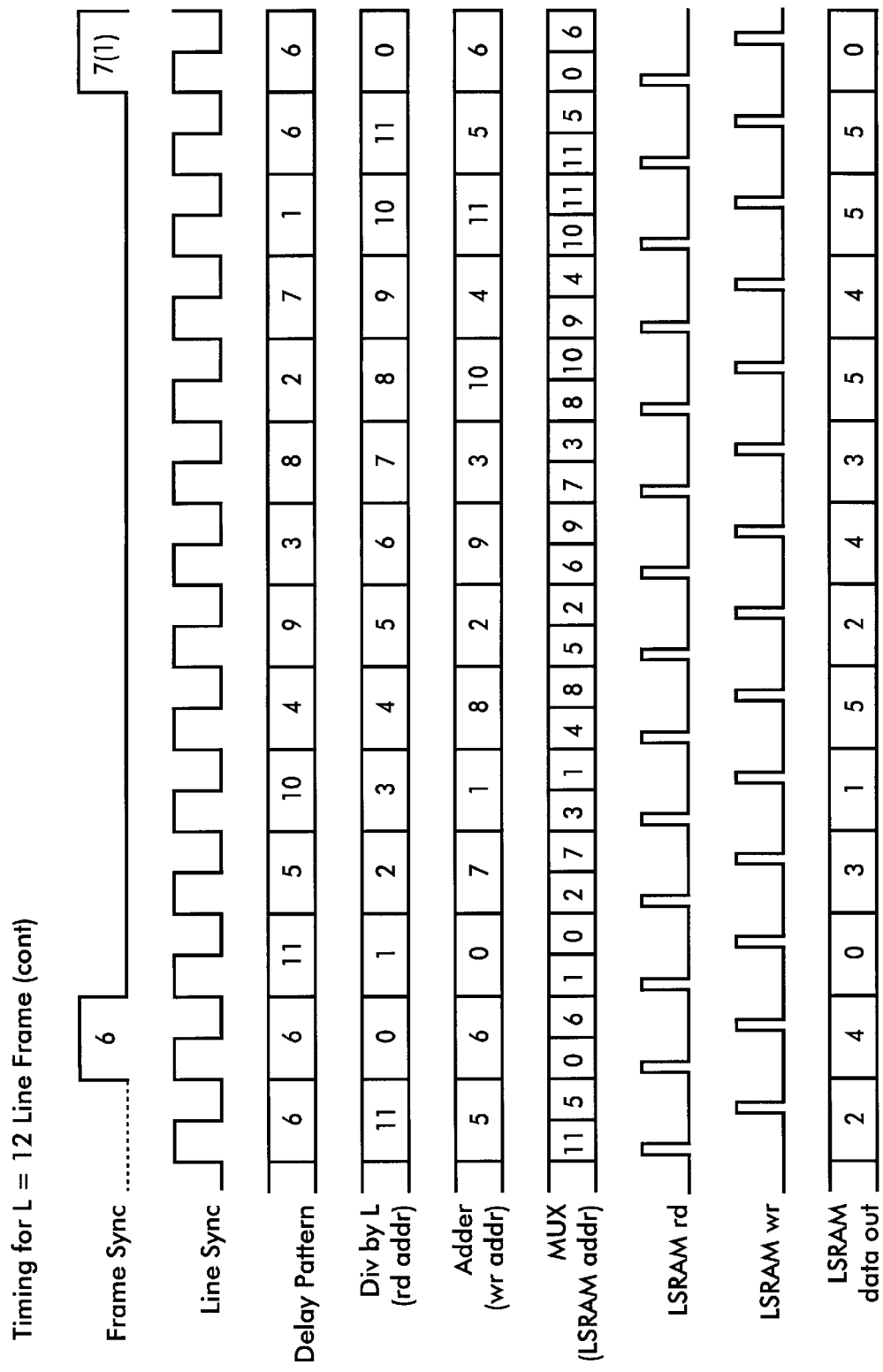

The operation of the line selector 26 shown in FIG. 11 is indicated by the timing diagram of FIGS. 12A–12C in the case where the video decoder 12 is outputting frame ordered video data. The multiplexer 76 selects first a read address and then a write address for application to the RAM 78 in response to the polarity of the line sync signal. The read/write controller 80 applies a read and then a write signal to the RAM 78 coincident with the respective read and write addresses provided by the multiplexer 76.

When a read address and a read signal are coincidentally applied to the RAM 78, data is read out of the RAM 78. This data forms the desired line select address. Then, a write address and a write signal are coincidentally applied to the RAM 78 causing that same data to be written into another storage location of the RAM 78. Thus, when a particular line select address is read from a storage location of the RAM 78 having a first RAM address, that same line select address is written into a storage location of the RAM 78 having a second RAM address. It can be seen from FIGS. 12A–12C that the second RAM address is greater than the first RAM address. In fact, the difference between the second RAM address and the first RAM address is an amount (DLY) equal to the delay pattern generator output. Accordingly, a line select address that is read out of the RAM 78 will again be read out of the RAM 78 exactly DLY cycles later. Assuming that the RAM 78 has been initialized correctly, it is clear from the timing diagram of FIGS. 12A–12C that this operation will continuously produce the desired line address sequences which are used to address the field-size memory 18.

The timing diagrams of FIGS. 12A–12C are for the twelve line hypothetical frame discussed above and show the generation of Seq1 and Seq2, before skipping to Seq6. In the case of this hypothetical frame, the RAM 78 contains six words and, upon initialization, the address locations 0, 1, 2, 3, 4, 5 of the RAM 78 contain the values 0, 1, 2, 3, 4, 5, respectively. The initialization input to the RAM 78, accordingly, causes the storage locations 0 through 5 to be reset to the values 0 through 5. Once initialized, the correct address sequences will be generated indefinitely unless the RAM 78 becomes somehow corrupted.

Figure 13:
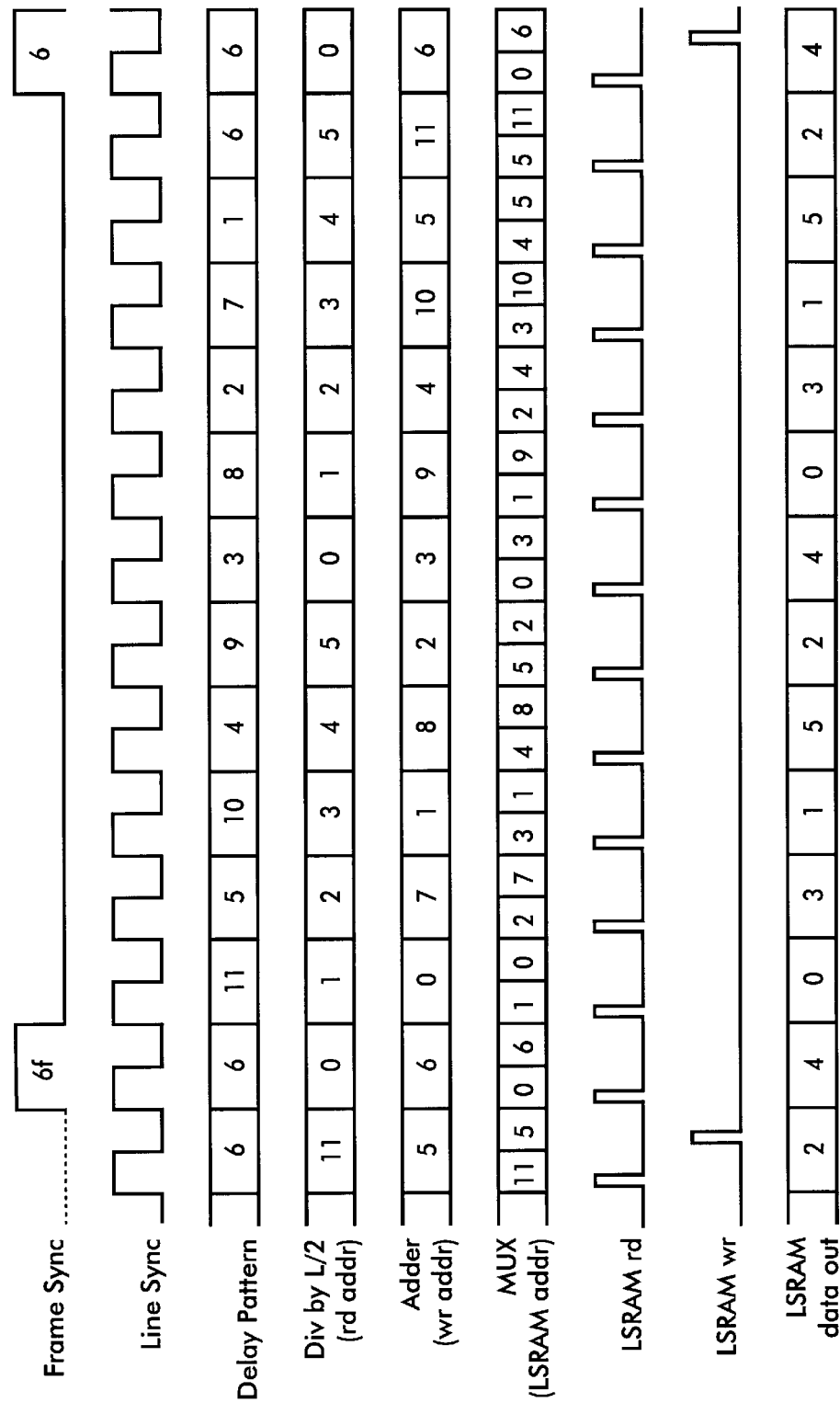
FIG. 13 illustrates a field order to field order timing chart for the line selector of FIG. 11; and, FIG. 14 illustrates an initializer which may be used in conjunction with the line selector of FIG. 11.

When the video decoder 12 outputs video data in field order, the divide-by-L counter 72 operates in a divide by L/2 mode, thus outputting counts in the following sequence: 0, 1, . . . , (L/2)–1, 0, 1, . . . . Also, as stated above, when the video decoder 12 outputs video data in field order, the read/write controller 80 is prevented from outputting write signals. These operations cause the line selector 26 to output SeqNf instead of SeqN. The timing chart of FIG. 13 shows this operation.

It should be understood that Seq1, Seq2, Seq3, Seq4, Seq5, and Seq6 are not the only line selecting address sequences that work for the twelve line hypothetical frame discussed above. In fact, other line selecting address sequences will work as long as the following key properties are observed in converting data in frame order to data in field order: (1) in the first half of the sequence (i.e., for the first L/2 line select addresses), each line select address must occur once, must not be repeated, and may occur in any order; and, (2) the correct delay pattern L/2, L-1, (L/2)–1, L–2, (L/2)–2, L–3, (L/2)–3, . . ., (L/2)–[(L–2)–1]=1, and L–(L/2)=L/2 must be used.

Accordingly, for the hypothetical twelve line frame where L=12, Seq1 must begin with all six line select addresses in any order with no repeats. Then, using the delay pattern 6, 11, 5, 10, 4, 9, 3, 8, 2, 7, 1, 6, a complete set of line select address sequences can be generated. For example, if Seq1 begins with 1, 0, 5, 4, 3, and 2 (instead of 0, 1, 2, 3, 4, 5), the delay pattern would produce the following sequences:

TABLE 2

| Row# | Col.# | 1 | 2 | 3 | 4 | 5 | 6 | 7 | 8 | 9 | 10 | 11 | 12 |
|---|---|---|---|---|---|---|---|---|---|---|---|---|---|
| 1 | Seq1: | 1 | 0 | 5 | 4 | 3 | 2 | 1 | 5 | 3 | 1 | 3 | 3 |
| 2 | Seq2: | 0 | 4 | 2 | 5 | 1 | 3 | 0 | 2 | 1 | 0 | 1 | 1 |
| 3 | Seq3: | 4 | 5 | 3 | 2 | 0 | 1 | 4 | 3 | 0 | 4 | 0 | 0 |
| 4 | Seq4: | 5 | 2 | 1 | 3 | 4 | 0 | 5 | 1 | 4 | 5 | 4 | 4 |
| 5 | Seq5: | 2 | 3 | 0 | 1 | 5 | 4 | 2 | 0 | 5 | 2 | 5 | 5 |
| 6 | Seq6: | 3 | 1 | 4 | 0 | 2 | 5 | 3 | 4 | 2 | 3 | 2 | 2 |
| 7 | Seq1: | 1 | 0 | 5 | 4 | 3 | 2 | 1 | 5 | 3 | 1 | 3 | 3 |

It should be noted that, since each line select address of the first L/2 addresses in Seq1 is used to generate all of the other line select addresses in the set, the starting point (the assignment of the label Seq1 to one of the sequences) is arbitrary. That is, any of the L/2 sequences can be Seq1. In the case of the hypothetical twelve line frame, there are 6! ((L/2)!) ways to order the digits 0, 1, 2, 3, 4, 5. So there are 6! possible sequences that can be used as Seq1. However, since the selection of Seq1 defines Seq2, Seq3, Seq4, Seq5, and Seq6, there are a total of (6–1)!=5! sets of sequences that will work. In general, there are ((L/2)–1)! different sets of line select address sequences that will work for an L line frame.

Figure 14:
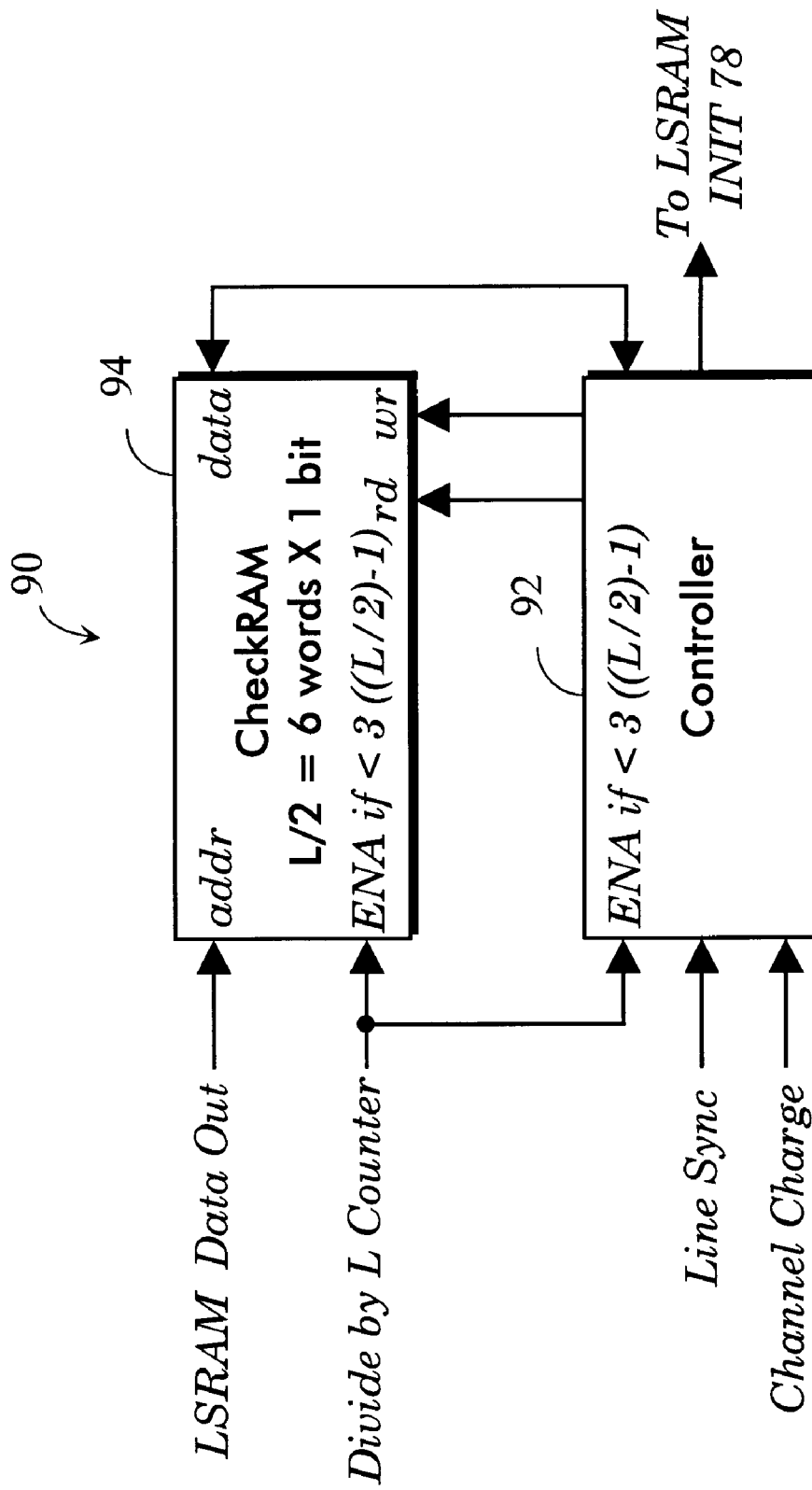

Thus, proper operation can be monitored by being sure that the first L/2 line selector address outputs for any frame consists of all of the numbers 0 through (L/2)–1 once and only once. These numbers can occur in any order. It follows that the line selector 26 will generate sequences that correctly do frame to field conversion. If any other condition is monitored, then the RAM 78 is corrupted and must be re-initialized. FIG. 14 is an initializer 90 that detects this corrupted condition and re-initializes the RAM 78.

The initializer 90 includes a controller 92 and a check ram 94 and initializes the RAM 78 in response to a channel change or in response to the detection of corrupted data in the RAM 78. The initializer 90 detects corrupted data in the RAM 78 by setting to one the bits at corresponding storage locations of the check ram 94 which are addressed by the first L/2 line select addresses of each line selecting sequence supplied by the RAM 78. If a bit at an addressed storage location of the check ram 94 is already set to one, the RAM 78 is corrupted and the controller 92 supplies an initialization signal to the RAM 78.

That is, both the controller 92 and the checkram 94 are enabled to detect corruption of the RAM 78 during the first half of each SeqN. The contents of the checkram 94 are cleared by a frame sync signal after L lines are read out of the RAM 78. At each line sync thereafter, the controller 92 reads a bit at the location of the checkram 94 addressed by the line select address output of the RAM 78 in response to a read signal from the controller 92. If this bit is zero, then the controller 92 writes a one to this same address location of the checkram 94 by providing a one on the data line interconnecting the controller 92 and the checkram 94 and by sending a write signal to the checkram 94. On the other hand, if the bit that is read is already one, the addressed location of the checkram 94 has already been accessed during the first half of the current line, and the output of the RAM 78 during the first half of the current line contains a repeated number. However, as discussed above, there should be no repeats of line select addresses in the first L/2 line select addresses in any sequence. Therefore, an address location of the checkram 94 which already contains a one indicates that the RAM 78 has been corrupted. When this corruption is detected by the controller 92, the controller 92 produces an initialization signal to the RAM 78 so that it will be properly re-initialized for the next frame.

Certain modifications of the present invention have been discussed above. Other modifications will occur to those practicing in the art of the present invention. For example, mappers other than those shown in FIGS. 3 and 4 may be used in connection with the address generator 20. Also, delay generators other than those shown in FIGS. 8 and 10 may be used in connection with the address generator 20.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A frame to field converter which converts input frames of video data to output fields of video data, wherein the input frames include input lines of video data, wherein the output fields include output lines of video data, and wherein the frame to field converter comprises:

a memory limited in size to substantially one field; and, an address generator arranged to address the memory so that, as each output line of video data is written out of the memory, it is replaced by an input line of video data.

2. The frame to field converter of claim 1 wherein a frame has effectively L lines of video data, wherein the memory locations of the memory are effectively arranged in L/2 lines, wherein the address generator is arranged to generate a set of different address sequences, wherein each address sequence has substantially L addresses, wherein a first of the address sequences has first and second groups of addresses each comprising substantially L/2 addresses, wherein the first group of addresses comprises substantially the first L/2 addresses of the first of the address sequences, wherein no address in the first group of addresses is repeated in the first group of addresses, and wherein the addresses of the second group of addresses and the addresses of the other address sequences in the set of different address sequences are determined from the first group of addresses based upon the following delay pattern: L/2, L−1, (L/2)−1, L−2, (L/2)−2, L−3, (L/2)−3, . . . , 1, L/2.

3. The frame to field converter of claim 2 wherein the address generator comprises a delay pattern generator, wherein the delay pattern generator is arranged to generate the delay pattern, and wherein the delay pattern generator comprises:

a divide-by-two counter driven by a line sync;

a divide-by-L/2 down counter responsive to the divide-by-two counter and reset by a frame sync;

an output selector arranged to provide an alternating output of one and L/2 in response to the divide-by-two counter; and, an adder arranged to add an output of the divide-by-L/2 down counter and the alternating output from the output selector.

4. The frame to field converter of claim 2 wherein the address generator comprises a delay pattern generator, wherein the delay pattern generator is arranged to generate the delay pattern, and wherein the delay pattern generator comprises:

a divide-by-L counter driven by a line sync and reset by a frame sync; and, a pattern storing memory storing the delay pattern, wherein the pattern storing memory is addressed by the divide-by-L counter in order to read out the stored delay pattern.

5. The frame to field converter of claim 1 wherein the address generator comprises:

a line selector, wherein the line selector is arranged to provide line select addresses for addressing the memory so that, as each output line of video data is read out of the memory, it is replaced by an input line of video data; and, a pixel selector, wherein the pixel selector is arranged to provide pixel addresses for addressing the memory so that, as each pixel of an addressed output line of video data is read out of the memory, it is replaced by a pixel of an input line of video data.

6. The frame to field converter of claim 5 wherein a frame includes L lines of video data, and wherein the line selector comprises:

a delay pattern generator arrange to produce a delay pattern in response to a line sync and a frame sync reset;

a divide-by-L counter arranged to produce L output counts in response to the line sync and the frame sync reset;

a modulo L adder arranged to add, modulo L, the delay pattern and the L output counts;

a multiplexer arranged to alternately provide an output of the modulo L adder as a write address and the L output counts as a read address; and, a line selector memory having an address input arranged to receive the write and read addresses from the multiplexer, an output arranged to provide the line select addresses, and a data input arranged to receive the output of the line selector memory.

7. The frame to field converter of claim 6 wherein the delay pattern is L/2, L−1, (L/2)−1, L−2, (L/2)−2, L−3, (L/2)−3, . . . , 1, L/2.

8. The frame to field converter of claim 6 wherein the delay pattern generator comprises:

a divide-by-two counter driven by the line sync;

a divide-by-L/2 down counter responsive to the divide-by-two counter and the frame sync reset;

an output selector arranged to provide an alternating output of one and L/2 in response to the divide-by-two counter; and, an adder arranged to add an output of the divide-by-L/2 down counter and the alternating output from the output selector.

9. The frame to field converter of claim 6 wherein the delay pattern generator comprises:

a divide-by-L counter driven by the line sync and reset by a frame sync; and, a pattern storing memory storing the delay pattern, wherein the pattern storing memory is addressed by the divide-by-L counter in order to read out the stored delay pattern.

10. The frame to field converter of claim 6 wherein the line selector memory has a third input, and wherein the line selector further comprises an initializer arranged to supply an initializing input to the third input to initialize the line selector memory to a predetermined set of L/2 addresses having no two addresses alike.

11. The frame to field converter of claim 10 wherein the initializer is arranged to supply an initializing input to the third input to initialize the line selector memory in response to a channel change.

12. The frame to field converter of claim 10 wherein the initializer is arranged to supply an initializing input to the third input to initialize the line selector memory in response to. corrupted data in the line selector memory.

13. The frame to field converter of claim 12 wherein the initializer comprises an initializer memory and a controller, wherein the initializer memory has a first input arranged to receive the output of the line selector memory as an address for the initializer memory, and wherein the controller writes a first predetermined value at each memory location of the initializer memory addressed by the output of the line selector memory if each such memory location of the initializer memory has a second predetermined value stored therein and initializes the line selector memory if any such memory location of the initializer memory has the first predetermined value stored therein.

14. The frame to field converter of claim 5 wherein a frame effectively has L lines of video data, wherein the memory locations of the memory are effectively arranged in L/2 lines, wherein the line selector is arranged to generate a set of different address sequences, wherein each address sequence has substantially L addresses, wherein a first of the address sequences has first and second groups of addresses each comprising substantially L/2 addresses, wherein the first group of addresses comprises substantially the first L/2 addresses of the first of the address sequences, wherein no address in the first group of addresses is repeated in the first group of addresses, and wherein the addresses of the second group of addresses and the addresses of the other address sequences in the set of different address sequences are determined from the first group of addresses based upon a delay pattern.

15. The frame to field converter of claim 14 wherein the delay pattern is L/2, L−1, (L/2)−1, L−2, (L/2)−2, L−3, (L/2)−3, . . . , 1, L/2.

16. The frame to field converter of claim 5 wherein the line selector has an output arranged to provide line selecting addresses, wherein the pixel selector has an output arranged to provide pixel selecting addresses, and wherein the address generator further comprises a mapper arranged to map the pixel selecting addresses and the line selecting addresses to consecutive memory selecting addresses for the memory.

17. The frame to field converter of claim 16 wherein there are P pixels per line, and wherein the mapper comprises:
   a multiplier arranged to multiply the line selecting addresses by P; and,
   an adder arranged to add an output of the multiplier to the pixel selecting addresses.

18. The frame to field converter of claim 16 wherein there are P pixels per line, wherein the pixel selector is a pixel counter having k pixel bits, wherein the pixel counter has a pixel count output and a carryover output, wherein the line selector is a line counter, wherein the line counter has a line count output and a carryover output, and wherein the mapper comprises:
   a latch arranged to be clocked by the carryover output from the pixel selector, arranged to be cleared by the carryover output from the line selector, and arranged to provide an output;
   an adder arranged to add the output of the latch to $(2^k-P)$ and to provide a result of the addition to an input of the latch; and,
   a subtractor arranged to subtract the output of the latch from a combined count output of the pixel selector and the line selector.

19. The frame to field converter of claim 5 wherein a frame effectively has L lines of video data, wherein the address generator is arranged to generate a set of different address sequences, wherein each address sequence has substantially L addresses, wherein each address sequence has first and second groups of addresses each comprising substantially L/2 addresses, and wherein the line selector, upon the frame to field converter receiving an input field instead of an input frame, is arranged to repetitively provide, as line select addresses, the first group of addresses of an address sequence until the frame to field converter next receives an input frame.

20. The frame to field converter of claim 19 wherein the first group of addresses of each address sequence comprises substantially the first L/2 addresses of the corresponding address sequences, and wherein no address in each first group of addresses is repeated in that first group.

21. A frame to field converter for converting a frame into an odd field and an even field comprising:
   a converter memory; and,
   an address generator arranged to repetitively generate a set of different address sequences and to sequentially apply the addresses of successive ones of the generated address sequences to the converter memory so as to convert a frame into an odd field and an even field, whereby a first group of lines of the frame is written into the converter memory in frame order, whereby the first group of lines is read out of the converter memory in field order and a second group of lines of the frame is written into the converter memory in frame order, and whereby as each line of the first group of lines is read out of the converter memory, it is replaced by a line of the second group of lines before a next line of the first group of lines is read out of the converter memory.

22. The frame to field converter of claim 21 wherein a frame has effectively L lines of video data, wherein each address sequence of the set of different address sequences has substantially L addresses, wherein a first of the address sequences has first and second groups of addresses each comprising substantially L/2 addresses, wherein the first group of addresses comprises substantially the first L/2 addresses of the first of the address sequences, wherein no address in the first group of addresses is repeated in the first group of addresses, and wherein the addresses of the second group of addresses and the addresses of the other address sequences in the set of different address sequences are determined from the first group of addresses based upon the following delay pattern: L/2, L−1, (L/2)−1, L−2, (L/2)−2, L−3, (L/2)−3, . . . , 1, L/2.

23. The frame to field converter of claim 22 wherein the address generator comprises a delay pattern generator, wherein the delay pattern generator is arranged to generate the delay pattern, and wherein the delay pattern generator employs a counting arrangement.

24. The frame to field converter of claim 22 wherein the address generator comprises a delay pattern generator, wherein the delay pattern generator is arranged to generate the delay pattern, and wherein the delay pattern generator employs a memory storing the delay pattern.

25. The frame to field converter of claim 21 wherein the address generator comprises:
   a delay pattern generator arrange to produce a delay pattern;
   a counter arranged to produce output counts; and,
   a memory arranged to produce the set of different address sequences in response to the delay pattern and the output counts.

26. The frame to field converter of claim 25 wherein the delay pattern is L/2, L−1, (L/2)−1, L−2, (L/2)−2, L−3, (L/2)−3, . . . , 1, L/2.

27. The frame to field converter of claim 25 wherein the delay pattern generator employs a counting arrangement.

28. The frame to field converter of claim 25 wherein the delay pattern generator employs a memory storing the delay pattern.

29. The frame to field converter of claim 21 wherein the address generator further comprises an initializer arranged to initialize the address generator to a predetermined set of addresses.

30. The frame to field converter of claim 29 wherein the initializer comprises an initializer memory and a controller, wherein the initializer memory has a first input arranged to receive the addresses of the address sequences as addresses for the initializer memory, and wherein the controller writes a first predetermined value at each memory location of the initializer memory addressed by a corresponding one of the addresses of the address sequences if each such memory location of the initializer memory has a second predetermined value stored therein and initializes the address generator if any such memory location of the initializer memory has the first predetermined value stored therein.

31. The frame to field converter of claim 21 wherein the address generator generates line selecting counts and pixel selecting counts, and wherein the address generator further comprises a mapper arranged to map the pixel selecting counts and the line selecting counts to consecutive memory selecting addresses for the converter memory.

32. The frame to field converter of claim 31 wherein there are P pixels per line, and wherein the mapper comprises:

a multiplier arranged to multiply the line selecting counts by P; and, an adder arranged to add an output of the multiplier to the pixel selecting counts.

33. The frame to field converter of claim 31 wherein the mapper comprises a memory which is used to map the pixel selecting counts and the line selecting counts to the address sequences.

34. The frame to field converter of claim 33 wherein the memory of the mapper is a latch.

35. The frame to field converter of claim 21 wherein the address generator, upon the frame to field converter receiving an input field instead of an input frame, is arranged to repetitively provide, as line select addresses for the converter memory, a portion of an address sequence until the frame to field converter next receives an input frame.

36. The frame to field converter of claim 35 wherein no address in the portion is repeated in that portion.

37. A frame to field converter comprising:

a converter memory; and, an address generator arranged to repetitively generate a set of address sequences and to sequentially apply the addresses of successive ones of the generated address sequences to the converter memory, whereby a first sequence of addresses has a first portion of addresses and a second portion of addresses, whereby no address is repeated in the first portion of addresses, whereby the addresses of the second portion of addresses and the addresses of the other address sequences in the set of address sequences are determined from the first portion of addresses based upon the following delay pattern: $L/2, L-1, (L/2)-1, L-2, (L/2)-2, L-3, (L/2)-3, \ldots, 1, L/2$, and whereby L is the number of lines in a frame and is constrained to be even.

* * * * *